United States Patent
Lee et al.

(10) Patent No.: US 7,465,501 B1
(45) Date of Patent: Dec. 16, 2008

(54) HIGH DENSITY MAGNETIC RECORDING MEDIA

(75) Inventors: Li-Lien Lee, San Jose, CA (US);
Michael Z. Wu, San Jose, CA (US);
Shanghsien S. Rou, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 446 days.

(21) Appl. No.: 11/018,471

(22) Filed: Dec. 22, 2004

(51) Int. Cl.
*G11B 5/65* (2006.01)

(52) U.S. Cl. ...................................... 428/829

(58) Field of Classification Search ................. 428/827, 428/828.1, 829
See application file for complete search history.

(56) References Cited

U.S. PATENT DOCUMENTS

| | | | |
|---|---|---|---|
| 6,143,388 A | 11/2000 | Bian et al. | |
| 6,150,016 A | 11/2000 | Song et al. | |
| 6,759,138 B2 | 7/2004 | Tomiyasu et al. | |
| 6,803,117 B2 * | 10/2004 | Akimoto et al. | 428/828 |
| 6,821,652 B1 * | 11/2004 | Okamoto et al. | 428/828.1 |
| 6,849,326 B1 * | 2/2005 | Lee et al. | 428/336 |
| 7,041,393 B2 * | 5/2006 | Tanahashi et al. | 428/831.2 |
| 2002/0068199 A1 | 6/2002 | Futamoto et al. | |
| 2002/0114978 A1 | 8/2002 | Chang et al. | |
| 2003/0049495 A1 | 3/2003 | Sakai et al. | |
| 2003/0096140 A1 * | 5/2003 | Tomiyasu et al. | 428/694 BS |
| 2003/0104248 A1 * | 6/2003 | Tomiyasu et al. | 428/693 |
| 2003/0129453 A1 * | 7/2003 | Wong | 428/694 DE |
| 2003/0138666 A1 | 7/2003 | Gouke et al. | |

* cited by examiner

*Primary Examiner*—Holly Rickman
*Assistant Examiner*—Gary Harris
(74) *Attorney, Agent, or Firm*—Darby & Darby PC

(57) ABSTRACT

A longitudinal magnetic recording medium comprising at least four magnetic layers including a substrate, a CoCrTa magnetic intermediate layer on the substrate, wherein the CoCrTa magnetic intermediate layer comprises Cr<16 at % and Ta<6 at %, a first CoCrPtB magnetic layer on the CoCrTa layer, wherein the first CoCrPtB magnetic layer comprises Cr: 10-14%, Pt: 4-8 at %, B: 6-10%, a second CoCrPtB magnetic layer on the first CoCrPtB magnetic layer, and a third CoCrPtB magnetic layer on the second CoCrPtB layer, wherein the third CoCrPtB magnetic layer comprises Cr: 12-16 at %, Pt: 12-16 at %, B: 10-14 at % and has <10 at % Cr than that in the second CoCrPtB magnetic layer is disclosed.

18 Claims, 3 Drawing Sheets

HIGH DENSITY MAGNETIC RECORDING MEDIA

FIELD OF INVENTION

The present invention relates to the recording, storage and reading of magnetic data, particularly magnetic recording media with at least four magnetic layers and having a performance that is substantially similar to that of anti-ferromagnetically coupled (AFC) media.

BACKGROUND

Magnetic disks and disk drives are conventionally employed for storing data in magnetizable form. Preferably, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk. Data are written onto and read from a rapidly rotating recording disk by means of a magnetic head transducer assembly that flies closely over the surface of the disk. Preferably, each face of each disk will have its own independent head.

In a magnetic media, digital information (expressed as combinations of "0's" and "1's") is written on tiny magnetic bits (which themselves are made up of many even smaller grains). When a bit is written, a magnetic field produced by the disc drive's head orients the bit's magnetization in a particular direction, corresponding to either a 0 or 1. The magnetism in the head in essence "flips" the magnetization in the bit between two stable orientations.

Magnetic thin-film media, wherein a fine grained polycrystalline magnetic alloy layer serves as the active recording medium layer, are generally classified as "longitudinal" or "perpendicular," depending on the orientation of the magnetic domains of the grains of the magnetic material. In longitudinal media (also often referred as "conventional" media), the magnetization in the bits is flipped between lying parallel and anti-parallel to the direction in which the head is moving relative to the disc. In perpendicular media, the magnetization of the disc, instead of lying in the disc's plane as it does in longitudinal recording, stands on end perpendicular to the plane of the disc. The bits are then represented as regions of upward or downward directed magnetization (corresponding to the 1's and 0's of the digital data).

FIG. 1 shows a disk recording medium and a cross section of a disc showing the difference between longitudinal and perpendicular recording. Even though FIG. 1 shows one side of the non-magnetic disk, magnetic recording layers are sputter deposited on both sides of the non-magnetic aluminum substrate of FIG. 1. Also, even though FIG. 1 shows an aluminum substrate, other embodiments include a substrate made of glass, glass-ceramic, NiP/aluminum, metal alloys, plastic/polymer material, ceramic, glass-polymer, composite materials or other non-magnetic materials.

Efforts are continually being made to increase the areal recording density, i.e., the bit density, or bits/unit area, and signal-to-medium noise ratio (SMNR) of the magnetic media. To continue pushing areal densities and increase overall storage capacity, the data bits must be made smaller and put closer together. However, there are limits to how small the bits may be made. If the bit becomes too small, the magnetic energy holding the bit in place may become so small that thermal energy may cause it to demagnetize over time. This phenomenon is known as superparamagnetism. To avoid superparamagnetic effects, disc media manufacturers have been increasing the coercivity (the "field" required to write a bit) of the disc. However, the fields that can be applied are limited by the magnetic materials from which the head is made, and these limits are being approached.

Newer longitudinal recording methods could allow beyond 140 gigabits per square inch in density. A great challenge however is maintaining a strong signal for the bits recorded on the media. When the bit size is reduced, the signal is decreased, making the bits more difficult to detect, as well as more difficult to maintain stable after recording information.

One of the key challenges to extending magnetic recording technology beyond the currently achieved 35-100 Gbit/in$^2$ areal densities is to improve the signal to noise ratio by media noise suppression. It is well known that the longitudinal scaling approach, which is to reduce the media grain surface area in proportion to the bit cell surface area, is limited by the onset of super-paramagnetic instability, which is explained above. Several options exist to avoid this problem. Traditionally, one has compensated the loss in grain volume by increasing the magnetic hardness (anisotropy); however, the write field of the recording head limits this approach. Anti-ferromagnetically coupled (AFC) dual-layer media have offered some relief by increasing the effective media thickness and consequently grain volume without compromising writability. The extendibility of this approach, however, appears to be rather limited. On the other hand, with three times smaller grain diameters, from currently about 9 nm down to about 3 nm, and correspondingly about ten times higher areal densities could be feasible if writing magnetically much harder materials, such as face-centered-tetragonal FePt alloys, can be accomplished.

This invention provides a multilayered thin film conventional magnetic medium utilizing an intermediate layer structure that has good magnetic recording performance for high density magnetic recording apparatus.

SUMMARY OF THE INVENTION

One embodiment of this invention relates to a longitudinal magnetic recording medium comprising at least four magnetic layers comprising: a substrate, a CoCrTa magnetic intermediate layer on the substrate, wherein the CoCrTa magnetic intermediate layer comprises Cr<16 at % and Ta<6 at %, a first CoCrPtB magnetic layer on the CoCrTa layer, wherein the first CoCrPtB magnetic layer comprises Cr: 10-14%, Pt: 4-8 at %, B: 6-10%, a second CoCrPtB magnetic layer on the first CoCrPtB magnetic layer, and a third CoCrPtB magnetic layer on the second CoCrPtB layer, wherein the third CoCrPtB magnetic layer comprises Cr: 12-16 at %, Pt: 12-16 at %, B: 10-14 at % and has <10 at % Cr than that in the second CoCrPtB magnetic layer. Preferably, the second CoCrPtB magnetic layer comprises Cr: 22-26 at %, Pt: 11-15 at % and B: 4-8 at %. The longitudinal recording medium could further comprise a non-magnetic HCP intermediate layer comprising Co and Cr with Cr content equal or greater than 30 at %, the non-magnetic HCP intermediate layer being located between the substrate and the CoCrTa magnetic intermediate layer. The longitudinal recording medium could further comprise an underlayer between the non-magnetic HCP intermediate layer and the substrate. Preferably, the underlayer comprises a BCC and/or B2 structured material. Preferably, the underlayer has a structure selected from a single layer, laminated multilayers comprising a BCC and/or B2 structured material, and laminated films of BCC and B2 structured materials. The longitudinal recording medium could further comprise a seedlayer. Preferably, the Mrt of the CoCrTa magnetic intermediate layer and the non-magnetic HCP intermediate layer is 10-15% of the total Mrt of the longitudinal recording medium. Preferably, the Mrt of the CoCrTa magnetic intermediate layer is 3-6% of the total Mrt of the longitudinal recording medium. Preferably, the third CoCrPtB magnetic layer further comprises 1-5 at % Cu.

Another embodiment is a method of manufacturing a longitudinal magnetic recording medium comprising at least four magnetic layers, the method comprising depositing a CoCrTa magnetic intermediate layer on a substrate, wherein the CoCrTa magnetic intermediate layer comprises Cr<16 at % and Ta<6 at %, depositing a first CoCrPtB magnetic layer on the CoCrTa layer, wherein the first CoCrPtB magnetic layer comprises Cr: 10-14%, Pt: 4-8 at %, B: 6-10%, depositing a second CoCrPtB magnetic layer on the first CoCrPtB magnetic layer, and depositing a third CoCrPtB magnetic layer on the second CoCrPtB layer, wherein the third CoCrPtB magnetic layer comprises Cr: 12-16 at %, Pt: 12-16 at %, B: 10-14 at % and has <10 at % Cr than that in the second CoCrPtB magnetic layer. The method of manufacturing could further comprise depositing a carbon overcoat and a lubricant layer.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention a property of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
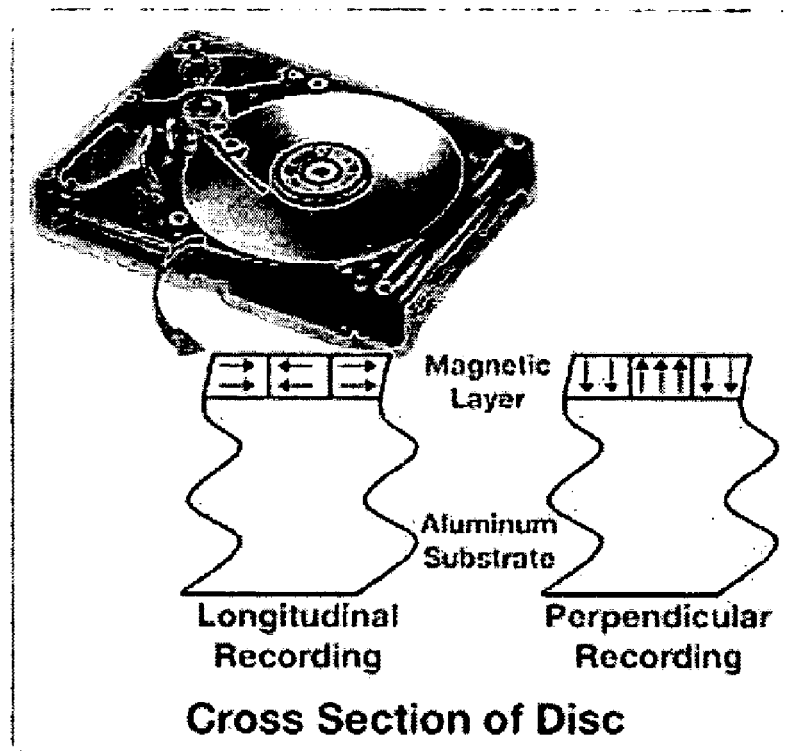
FIG. 1 schematically shows a magnetic disk recording medium comparing longitudinal or perpendicular recording.

Manufacturers of magnetic thin film recording media often use multilayers of magnetic alloys to improve media performance. Desired improvements include: enhancement of epitaxial film growth, reduction of magnetic cluster size through compositional segregation and grain size refinement, and increase of the effective magnetic anisotropy of the layered film. Although antiferromagnetic coupled (AFC) medium is widely used for high density magnetic recording, the inventors of this application have found that by proper engineering of the multilayered medium structure a conventional (non AFC) medium could have comparable or better recording performance. Conventional medium, in general, has a better bit-error-rate (BER) than that of an AFC medium because the total magnetic layer thickness is thinner in a conventional medium. In addition, film deposition process for a conventional medium is less complicated than for AFC medium. Unless the magnetic media can not meet the thermal stability requirement, recording medium manufacturers would prefer to continue making conventional media. The inventors have extensively investigated many conventional media having 3 or 4 magnetic layers and have found unexpected combinations of the magnetic layers to achieve a recording density of 50 Gbit/in$^2$ or higher.

One way to result in an improvement in the signal to noise ratio (SNR) of longitudinal magnetic recording media (for further increasing the recording density) is by decreasing the average grain volume, V. The attainable SNR increases as $\sim N^{1/2}$ with the number of grains, N, per recorded transition as well as with decreasing $M_r t$ of the recording media. $M_r t$ is the product of the remanent magnetization, $M_r$, and the film thickness, t, of the magnetic material. Both ways to increase SNR lead to a smaller energy barrier, $K_u V$, which resists magnetization reversal due to thermal agitation. The volume reduction can be partially offset by increasing the anisotropy of the material used in the media, but the available writing fields limit the anisotropy increase. Also, anti-ferromagnetically coupled (AFC) media could be used for increasing recording density of longitudinal magnetic recording media.

The signal voltage produced by the magnetic media is proportional to $M_r t$, which contains all the media parameters. For example, in the case of a particulate media, the particles of the magnetic material are relatively apart and have low $M_r$; hence, such a media would require a large film thickness of the magnetic layer to produce a high $M_r t$. On the other hand, a film using materials in which approximately 100% of the material is magnetic can give adequate signal voltage with even a thin film because the $M_r t$ of such a film can be sufficiently large.

This invention is based on the discovery that improved high areal recording density, thin-film, multi-magnetic layer magnetic media having improved performance, e.g., enhanced signal voltage can be reliably and controllably manufactured so as to obtain benefits of AFC media and longitudinal media. The benefit of the AFC media is smaller grain size primarily due to a Ru spacer layer, and weakly due to coupling, while the benefit of the conventional media is a high signal voltage and bit-error-rate (BER). The recording results show that the new design of this invention produces improved stability and writability in comparison to prior longitudinal media. Also, the BER is better than the BER of the AFC media. While the exact mechanism for the improvements observed by the media of this invention is not well understood, arguably, the improved performance of the media of this invention could be due to microstructure changes resulting from the new multi-layer of magnetic layers design.

When referring to magnetic recording media, there are two basic types: oriented and isotropic. Isotropic media has the magnetic layer and under-layers, which are used to control the crystallographic orientation of the magnetic layer, applied to a non-preferentially polished substrate. Oriented media has a scratch pattern or texture on the disc surface. The texture improves magnetic orientation and enhances film performance by initiating grain growth. Also, the texture causes magnetic properties in down-track and cross-track directions to be different, which could greatly increase media signal-to-noise ratio, thereby greatly improving media performance and density. To texture the surface of a glass substrate, seed-layer materials such as a nickel phosphorus layer is applied, which is then textured. This recording media of this invention could be oriented or isotropic, though oriented media using textured substrate is preferred. The substrate could be a glass substrate or aluminum substrate, preferably with a NiP coating.

A magnetic medium of this invention for high density magnetic recording has more than two magnetic layers, preferably four or more magnetic layers. Optionally, there could be a seedlayer having a structure that is predominantly amorphous and is used to improve film adhesion, to enhance a specific underlayer crystallographic orientation, to refine grain medium's grain size and to increase medium's Mrt orientation ratio, where Mrt is the product of residual magnetic flux density and film thickness. Preferably, the underlayer has a BCC or B2 structure and can be laminated films of BCC, B2, or both BCC and B2 structured materials. In one variation, the medium of this invention could have an intermediate layer having a HCP structure and being optionally being composed of laminated films of non-magnetic, magnetic, or both nonmagnetic and magnetic materials.

The top magnetic layers are situated closest to the recording read/write head and are preferably composed of CoCrPtB alloys with a HCP crystalline structure are preferably deposited on the intermediate layer. Preferably, the two top magnetic layers have less than 10 at % difference in Cr content. The multilayered medium is preferably capped with a carbon overcoat and a lubricant layer for tribological purpose.

During the course of this invention, it was found that the intermediate layers could play a significantly important role in determining the quality of the recording performance of the medium. The HCP intermediate layer should preferably have good hetero-epitaxial growth on the underlayer to produce a well oriented in-plane c-axis texture, and in the mean time have small grain size and well magnetically separated grain boundaries. By this invention, these requirements were achieved by adjusting alloying additions of the HCP intermediate layer or by employing multi-layered HCP films of different compositions. The preferred option is the later approach. It was found that by properly laminating magnetic intermediate layers of CoCrTa and CoCrPtB, the magnetic medium's recording performance could be improved substantially.

For conventional (non-antiferromagnetically coupled) magnetic media of this invention, in one embodiment when the underlayer has a crystallographic texture such that (002) is predominately parallel to the film surface, a magnetic intermediate layer of CoCrTa is superior to a non-magnetic intermediate layer of other CoCr alloys.

A CoCrTa (such as $CoCr_{14}Ta_4$) could be well suited for the intermediate magnetic layer because the CoCrTa layer helps later deposited HCP film layers to grow with a strong ($11\bar{2}0$) crystallographic texture on the (002) oriented BCC underlayers. Preferably, the CoCrTa alloy has a Cr content of less than 16 at % and a Ta content of less than 6 at %. However, the magnetic intergranular exchange coupling of such a CoCrTa intermediate layer could be high and therefore introduce undesired medium noise. This problem was unexpectedly resolved during this invention by adding a B-containing magnetic layer which had a better grain boundary separation and smaller grain size than in the CoCrTa layer. Preferably, the B-containing magnetic layer has a Cr content of 10-14 at %, Pt 4-8 at % and B 6-10 at % and Co the balance. Such a dual-layered structure of CoCrTa and CoCrPtB was found to have good recording performance, accounting for 10-15% of the total Mrt of the medium.

Figure 2:
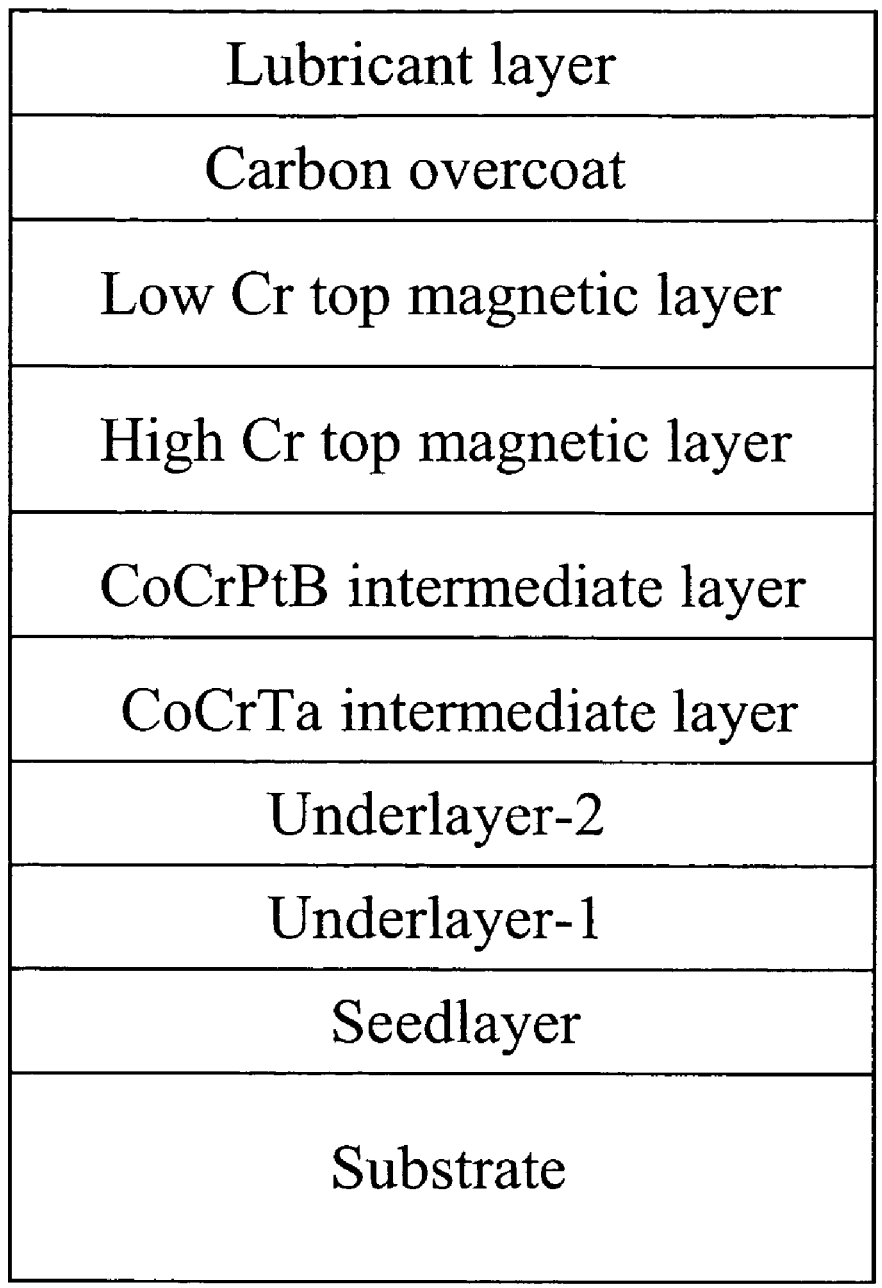
FIG. 2 shows an embodiment of the magnetic media of this invention.

FIG. 2 shows a simplified cross-sectional view of an embodiment of this invention. The film structure of the magnetic media could include the following layers:

(1) Substrate, which could optionally have a non-oxidized or oxidized NiP seedlayer. An additional seedlayer composed of amorphous or fine grain material such as NiAl, CrTi may be present.

(2) Under layers capable of controlling the crystallographic texture of Co-based alloys.

(3) Magnetic layers that could have the following layer design:

(a) The first magnetic layer having hexagonal close pack, hcp, crystal structure and comprising CoCrTa. Preferably, the first magnetic layer is thin (less than 1 nm, but preferably about 0.5 nm).

(b) The second magnetic layer having hexagonal close pack, hcp, crystal structure and comprising CoCrPtB. This layer may also contain minor amounts of at least one bcc-structured element selected from the group consisting of W, Mo, Ta, Nb, Cr, and V. This layer is at least one atomic layer thick, preferably, about 0.2 to 3 nm.

(c) The third magnetic layer having hexagonal close pack, hcp, crystal structure and having a high Cr content in the range of 20-28 atomic percent with one or more added elements selected from Co, Pt, B, Ta, Ti, Zr, Hf, Mo, Ru, Si, Ge, Nb, Fe, Ni and combinations thereof. This layer has a thickness in the range of 3 nm to 12 nm.

(4) A top magnetic layer having a low Cr content that is at least 8 atomic percent less than the Cr content of the third magnetic layer. The top magnetic layer could be an alloy having a material selected from the group consisting of Co, Pt, B, Ta, Mo, Ru, Si, Ge, Nb, Fe, Ni and combinations thereof.

In general Cr-rich magnetic layer is located adjacent to the Cr-diluted magnetic layer.

Instead, of a NiP seedlayer, the seedlayer on the substrate could be any Ni-containing seedlayer such as a NiNb seedlayer, a Cr/NiNb seedlayer, or any other Ni-containing seedlayer. Optionally, there could be an adhesion layer between the substrate and the seedlayer. The surface of the Ni-containing seedlayer could be optionally oxidized. Other seedlayers, such as Cr or Co containing amorphous layers, can also be used.

Embodiments of this invention include deposition of an underlayer, such as Cr or a Cr-alloy underlayer, e.g., CrMo and CrB, on the Ni-containing seedlayer. Embodiments of this invention include the use of any of the various magnetic alloys containing B, Cr and Co, such as CoCrB, CoCrPtB, CoCrNiB, CoCrNiPtB, CoCrNiTaB, CoCrNiNbB, CoCrPtTaB, CoCrPtNbB and CoCrPtTaNbB, and other combinations of B, Cr, Co, Pt, Ni, Ta and Nb, in the magnetic layer.

In a preferred embodiment, the magnetic layers comprise CoCrTa and CoCrPtB with different atomic percent of the elements. The CoCrPtB composition could comprise 6-30 atomic percent Cr, 1 to 20 atomic percent Pt, 2 to 18 atomic percent B, and Co in the balance. In one embodiment, the magnetic layers have a thickness in the range of 10-50 nm, preferably about 20 nm, and the amount of Cr in the magnetic layer(s) varies discontinuously or continuously across the thickness to form discrete Cr-rich and Cr-dilute layers or a continuous variation in Cr-concentration across the thickness of the magnetic layer(s). Preferably, the Cr-rich layer or Cr-rich phase of the magnetic layer(s) is adjacent to another magnetic layer(s) having a more diluted Cr content.

In a preferred embodiment, the thickness of the seedlayer is about 20 Å to about 2000 Å, the thickness of the underlayer is about 10 Å to about 1000 Å, and the thickness of the magnetic layer is about 40 Å to about 300 Å. In another preferred embodiment, the thickness of the adhesion layer is about 3 Å to about 1000 Å, the thickness of the seedlayer is about 20 Å to about 2000 Å, the thickness of the underlayer is about 10 Å to about 1000 Å, and the thickness of the magnetic layer is about 40 Å to about 300 Å.

In a preferred embodiment, the thickness of the adhesion layer, if present, is 3 Å to about 250 Å, preferably between 5 Å and 150 Å, and most preferably about 20 Å. In a preferred embodiment, the thickness of the seedlayer is 20 Å to about 1600 Å, preferably between 40 Å and 1200 Å. In a preferred embodiment, the thickness of the underlayer is 12 Å to about 500 Å, preferably between 15 Å and 250 Å, and most preferably about 25 Å. In a preferred embodiment, the thickness of the magnetic layer is 55 Å to about 250 Å, preferably between 80 Å and 225 Å, and most preferably about 170 Å. In a preferred embodiment, the thickness of the protective layer is 10 Å to about 300 Å, preferably between 20 Å and 60 Å, and most preferably about 30 Å. The protective layer can be made of hydrogenated carbon ($CH_x$).

The magnetic recording medium has a remanent coercivity of about 2000 to about 10,000 Oersted, and an $M_r t$ (product of remanance, Mr, and magnetic layer thickness, t) of about 0.15 to about 2.0 memu/$cm^2$. In a preferred embodiment, the coercivity is about 2500 to about 9000 Oersted, more preferably in the range of about 3000 to about 6000 Oersted, and most preferably in the range of about 3500 to about 5000 Oersted. In a preferred embodiment, the $M_r t$ is about 0.2 to about 1 memu/$cm^2$, more preferably in the range of about 0.25 to about 0.45 memu/$cm^2$, and most preferably in the range of about 0.27 to about 0.4 memu/$cm^2$.

Figure 3:
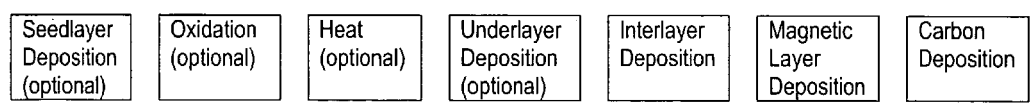
FIG. 3 an embodiment of the manufacturing process of this invention.

An apparatus for manufacturing magnetic recording media in accordance with the embodiments of the present invention is schematically illustrated in FIG. 3. The disk substrates travel sequentially through the deposition stations. The disks pass through stations for seedlayer deposition, oxidation, heating, underlayer deposition, interlayer deposition and magnetic layer deposition. The disks are then passed to the protective carbon overcoat deposition station. Other embodiments would require variations to the process of FIG. 3 using well-known processing techniques or structures that are not described herein.

Almost all the manufacturing of a disk media takes place in clean rooms where the amount of dust in the atmosphere is kept very low, and is strictly controlled and monitored. After one or more cleaning and texturing processes on a non-magnetic substrate, the substrate has an ultra-clean surface and is ready for the deposition of layers of magnetic media on the substrate.

Each of the layers constituting magnetic recording media of the present invention, except for a lubricant topcoat layer, may be deposited or otherwise formed by any suitable physical vapor deposition technique (PVD), e.g., sputtering, or by a combination of PVD techniques, i.e., sputtering, vacuum evaporation, etc., with sputtering being preferred. The lubricant layer is typically provided as a topcoat by dipping of the medium into a bath containing a solution of the lubricant compound, followed by removal of excess liquid, as by wiping, or by a vapor lube deposition method.

Sputtering is perhaps the most important step in the whole process of creating recording media. There are two types of sputtering: pass-by sputtering and static sputtering. In pass-by sputtering, disks are passed inside a vacuum chamber, where they are bombarded with the magnetic and non-magnetic materials that are deposited as one or more layers on the substrate. Static sputtering uses smaller machines, and each disk is picked up and sputtered individually.

The sputtering layers are deposited in what are called bombs, which are loaded onto the sputtering machine. The bombs are vacuum chambers with targets on either side. The substrate is lifted into the bomb and is bombarded with the sputtered material.

Sputtering leads to some particulates formation on the post sputter disks. These particulates need to be removed to ensure that they do not lead to the scratching between the head and substrate. Thus, a lube is preferably applied to the substrate surface as one of the topcoat layers on the substrate.

Once a lube is applied, the substrates move to the buffing/burnishing stage, where the substrate is polished while it preferentially spins around a spindle. After buffing/burnishing, the substrate is wiped and a clean lube is evenly applied on the surface.

Subsequently, the disk is prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the substrate.

EXAMPLES

Two thin film media with and without the CoCrPtB intermediate layer were deposited for comparison. Example 1 is the one with the CoCrPtB intermediate layer and Example 2 has no CoCrPtB intermediate layer. Their film structures are:

Example 1

Glass substrate \CoW \Cr \$CrMo_{10}Ta_3$ \$CoCr_{14}Ta_4$ \$CoCr_{12}Pt_6B_8$ \$CoCr_{24}$\$Pt_{13}B_6$ \$CoCr_{13}Pt_{14}B_{12}Cu_4$ \carbon overcoat \lubricant The thicknesses of the magnetic layers are adjusted such that the Mrt contribution from the $CoCr_{13}$\$Pt_{14}B_{12}Cu_4$ layer is 52%, $CoCr_{24}$\$Pt_{13}B_6$ 36%, $CoCr_{12}Pt_6B_8$ 8% and $CoCr_{14}Ta_4$ 4% of the total medium Mrt, where the Mrt values are measured with a rotating disk magnetometer (RDM).

Example 2

Glass substrate \CoW \Cr \$CrMo_{10}Ta_3$ \$CoCr_{14}Ta_4$ \$CoCr_{24}Pt_{13}B_6$ \$CoCr_{13}Pt_{14}B_{12}Cu_4$ \carbon overcoat \lubricant The thicknesses of the magnetic layers are adjusted such that the Mrt contribution from the $CoCr_{13}Pt_{14}B_{12}Cu_4$ layer is 52%, $CoCr_{24}Pt_{13}B_6$ 36% and $CoCr_{14}Ta_4$ 12% of the total medium Mrt.

These two disks with almost the same Hcr and Mrt were tested on a spinstand with a GMR head at 120 ktpi, 684 kbpi, 5400 rpm. The bit-error-rate (BER) and over write (OW) are listed in Table 1. The addition of this CoCrPtB intermediate layer improves BER by ~0.3 decade and improves over write by ~2.5 dB. The improvements depend on the alloys used for the top magnetic layers. However, with many different alloys tested for the top magnetic layers we have consistently observed improved recording performance associated with the CoCrPtB magnetic intermediate layer.

TABLE 1

Hcr, Mrt, S*, over write and Bit-error-rate of a medium with CoCrTa\CoCrPtB intermediate layer (example #1) and a medium with CoCrTa intermediate layer

| Example # | Hcr, Oe | Mrt, memu/$cm^2$ | S* | OW, dB | BER |
|---|---|---|---|---|---|
| 1 | 4554 | 0.35 | 0.86 | 33.9 | $10^{-4.83}$ |
| 2 | 4565 | 0.35 | 0.87 | 31.3 | $10^{-4.52}$ |

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A longitudinal magnetic recording medium comprising at least four magnetic layers comprising:
    a substrate,
    a CoCrTa magnetic intermediate layer on the substrate, wherein the CoCrTa magnetic intermediate layer comprises Cr<16 at % and Ta<6 at %,
    a first CoCrPtB magnetic layer on the CoCrTa layer, wherein the first CoCrPtB magnetic layer comprises Cr: 10-14%, Pt: 4-8 at %, B: 6-10%,
    a second CoCrPtB magnetic layer on the first CoCrPtB magnetic layer, and
    a third CoCrPtB magnetic layer on the second CoCrPtB layer, wherein the third CoCrPtB magnetic layer comprises Cr: 12-16 at %, Pt: 12-16 at %, B: 10-14 at % and has <10 at % Cr than that in the second CoCrPtB magnetic layer, wherein the magnetic intermediate layer has a different composition than that of the first, second and third magnetic layers, wherein the second CoCrPtB magnetic layer comprises Cr: 22-26 at %, Pt: 11-15 at % and B: 4-8 at %.

2. The longitudinal recording medium of claim 1, further comprising a non-magnetic HCP intermediate layer comprising Co and Cr with Cr content equal or greater than 30 at %, the non-magnetic HCP intermediate layer being located between the substrate and the CoCrTa magnetic intermediate layer.

3. The longitudinal recording medium of claim 2, further comprising an underlayer between the non-magnetic HCP intermediate layer and the substrate.

4. The longitudinal recording medium of claim 3, wherein the underlayer comprises a BCC and/or B2 structured material.

5. The longitudinal recording medium of claim 2, wherein the underlayer has a structure selected from a single layer, laminated multilayers comprising a BCC and/or B2 structured material, and laminated films of BCC and B2 structured materials.

6. The longitudinal recording medium of claim 3, further comprising a seedlayer.

7. The longitudinal recording medium of claim 2, wherein Mrt of the CoCrTa magnetic intermediate layer and the non-magnetic HCP intermediate layer is 10-15% of the total Mrt of the longitudinal recording medium.

8. The longitudinal recording medium of claim 2, wherein Mrt of the CoCrTa magnetic intermediate layer is 3-6% of the total Mrt of the longitudinal recording medium.

9. The longitudinal recording medium of claim 1, wherein the third CoCrPtB magnetic layer further comprises 1-5 at % Cu.

10. A longitudinal magnetic recording medium comprising at least four magnetic layers comprising:
    a substrate,
    a magnetic intermediate layer comprising CoCrTa,
    a first magnetic layer comprising CoCrPtB,
    a second magnetic layer comprising CoCrPtB, wherein the second magnetic layer has a different composition than that of the first magnetic layer, and
    a third magnetic layer comprising CoCrPtB, wherein the third magnetic layer has a different composition than that of the first and second magnetic layers and the magnetic intermediate layer.

11. The longitudinal magnetic recording medium of claim 10, wherein the magnetic intermediate layer comprises Cr<16 at % and Ta<6 at %.

12. The longitudinal magnetic recording medium of claim 10, wherein the second magnetic layer comprises Cr: 22-26 at %, Pt: 11-15 at % and B: 4-8 at %.

13. The longitudinal magnetic recording medium of claim 10, wherein the third magnetic layer comprises Cr: 12-16 at %, Pt: 12-16 at %, B: 10-14 at % and has <10 at % Cr than that in the second magnetic layer.

14. The longitudinal magnetic recording medium of claim 10, further comprising a non-magnetic HCP intermediate layer comprising Co and Cr with Cr content equal or greater than 30 at %, the non-magnetic HCP intermediate layer being located between the substrate and the magnetic intermediate layer.

15. The longitudinal magnetic recording medium of claim 10, further comprising an underlayer between the non-magnetic HCP intermediate layer and the substrate, wherein the underlayer comprises a BCC and/or B2 structured material.

16. The longitudinal magnetic recording medium of claim 15, wherein the underlayer has a structure selected from a single layer, laminated multilayers comprising a BCC and/or B2 structured material, and laminated films of BCC and B2 structured materials.

17. The longitudinal magnetic recording medium of claim 14, wherein Mrt of the CoCrTa magnetic intermediate layer and the non-magnetic HCP intermediate layer is 10-15% of the total Mrt of the longitudinal recording medium.

18. The longitudinal recording medium of claim 10, wherein the third magnetic layer further comprises 1-5 at % Cu.

* * * * *